United States Patent
Deseure et al.

(10) Patent No.: US 11,955,013 B2
(45) Date of Patent: Apr. 9, 2024

(54) ELECTRONIC DEVICE AND METHOD FOR ASSISTING IN THE CONFIGURATION OF AN AIRCRAFT FLIGHT, RELATED COMPUTER PROGRAM

(71) Applicant: THALES, Courbevoie (FR)

(72) Inventors: Chris Deseure, Toulouse (FR); Sébastien Boussiron, Merignac (FR); Yannick Le Roux, Merignac (FR)

(73) Assignee: THALES, Courbevoie (FR)

( * ) Notice: Subject to any disclaimer, the term of this patent is extended or adjusted under 35 U.S.C. 154(b) by 554 days.

(21) Appl. No.: 17/236,672

(22) Filed: Apr. 21, 2021

(65) Prior Publication Data

US 2021/0335136 A1     Oct. 28, 2021

(30) Foreign Application Priority Data

Apr. 28, 2020 (FR) ..................... 20 04190

(51) Int. Cl.
*G08G 5/00* (2006.01)

(52) U.S. Cl.
CPC .......... *G08G 5/0021* (2013.01); *G08G 5/003* (2013.01); *G08G 5/0047* (2013.01); *G08G 5/0073* (2013.01)

(58) Field of Classification Search
CPC .... G08G 5/0021; G08G 5/003; G08G 5/0047; G08G 5/0073; G08G 5/0039; G08G 5/025; G08G 5/045; G08G 5/065; G01C 23/00
See application file for complete search history.

(56) References Cited

U.S. PATENT DOCUMENTS

| | | | | |
|---|---|---|---|---|
| 9,530,322 B2 * | 12/2016 | Caudron | | G08G 5/0039 |
| 9,616,993 B1 | 4/2017 | Shapiro et al. | | |
| 2016/0347176 A1 * | 12/2016 | Kawalkar | | B60K 35/00 |
| 2017/0291691 A1 | 10/2017 | Barral et al. | | |
| 2019/0171337 A1 | 6/2019 | Perrin et al. | | |

OTHER PUBLICATIONS

International Search Report issued in corresponding French Application No. 2004190 dated Jan. 22, 2021.

* cited by examiner

*Primary Examiner* — Shon G Foley
(74) *Attorney, Agent, or Firm* — ArentFox Schiff LLP (57) ABSTRACT

This electronic configuration assist device of a flight of an aircraft includes:
- an acquisition module configured to acquire a flight modality, previously selected by a user from a set of predefined flight modalities;
- a determination module configured to determine a group of avionics functional component(s) as a function of the acquired modality, each functional component having an elementary score for each predefined flight modality, an overall score being calculated for each possible group of components from the elementary score or scores of the components of the said group for the acquired modality, the determined group being the one having the best overall score among the calculated overall scores;
- a display module configured to display information relating to each component of the determined group of avionics functional component(s).

16 Claims, 5 Drawing Sheets

ELECTRONIC DEVICE AND METHOD FOR ASSISTING IN THE CONFIGURATION OF AN AIRCRAFT FLIGHT, RELATED COMPUTER PROGRAM

CROSS-REFERENCE TO RELATED APPLICATIONS

This application is a U.S. non-provisional application claiming the benefit of French Application No. 20 04190, filed on Apr. 28, 2020, which is incorporated herein by reference in its entirety.

FIELD

The present invention relates to an electronic device for assisting in the configuration of a flight of an aircraft.

The invention also relates to a method for assisting in the configuration of a flight of an aircraft, the method being implemented by such an electronic configuration assist device.

The invention also relates to a non-transitory computer-readable medium comprising a computer program including software instructions which, when executed by a computer, implement such a configuration assist method.

The invention then relates to the field of devices for assisting the piloting of an aircraft, in particular for assisting in the configuration of the flight of the aircraft, whether before a flight, for example during mission preparation, during the flight itself, or again after the flight, for example during taxiing after landing, or again after the arrival of the aircraft at its parking point. The user of such a piloting assist device is then preferably the pilot or co-pilot of the aircraft.

BACKGROUND

Currently, pilots rely predominantly on paper documents, or scanned documents, or a combination of software applications such as those implemented on a portable electronic device, such as an EFB (Electronic Flight Bag), when they are outside the aircraft. When the pilot is on board the aircraft, he or she essentially uses the embarked avionics systems of the aircraft to manage the flight.

However, such a disparity in the work media offered to pilots is not ideal since the pilot must then regularly switch from one work medium to another.

SUMMARY

The object of the invention is then to propose an electronic device, and a related method, to assist in the configuration of a flight of an aircraft allowing to facilitate the work of the user, such as the pilot of the aircraft, either before the flight, during the flight, or after the flight.

For this purpose, the invention has as its object an electronic device for assisting in the configuration of a flight of an aircraft, the device comprising:
  an acquisition module configured to acquire a flight modality, previously selected by a user from a set of predefined flight modalities;
  a determination module configured to determine a group of avionics functional component(s) as a function of the acquired modality, each functional component presenting an elementary score for each predefined flight modality, an overall score being calculated for each possible group of components from the elementary score(s) of the components of the said group for the acquired modality, the determined group being the one having the best overall score among the calculated overall scores;
  a display module configured to display information relating to each component of the determined group of avionics functional component(s).

The configuration assist device according to the invention then makes it possible to propose to the user an adaptive workspace, which adapts in particular to the flight modality previously selected by the user, the group of avionics functional components displayed being determined according to the said modality previously selected by the user, then acquired by the acquisition module.

The group of displayed avionics functional components is preferably determined according to user characteristics and/or characteristics relative to the company chartering the aircraft, and the workspace is then also adaptive to the habits of the user, or to a previous flight history of the aircraft.

The information relative to each component of the given group is preferably also capable of being displayed, by the display module, on any display screen, in particular both on a screen of a personal electronic device, also known as a PED (Personal Electronic Device), and on a display screen embarked in the aircraft cockpit. In other words, the workspace is then accessible both on the PED and on the cockpit screen.

The person skilled in the art will also understand that the configuration assist device according to the invention makes it possible to propose such an adaptive workspace to the user, without the user having to intervene to modify this workspace, apart from the prior selection of the desired flight modality.

According to other advantageous aspects of the invention, the electronic configuration assist device includes one or more of the following characteristics, taken in isolation or in any technically possible combination:
  the electronic device further comprises a generation module configured to generate, via the determined group of avionics functional components, at least one change command relating to a phase of flight of the aircraft;
  the electronic device further comprises a transmission module configured to transmit each generated change command to at least one corresponding avionics system;
  each avionics system being preferably selected from the group consisting of: a flight management system (FMS), a flight warning system (FWS), a radio management system (RMS), a communications management unit (CMU), an air traffic services unit (ATSU), a traffic collision alert system (TCAS), a terrain awareness and warning system (TAWS), and an autopilot system (AP);
  each generated change command is a change command for the parameter(s) of an avionics function;
  each generated change command is preferably selected from the group consisting of: a speed change command, an altitude change command, a route change command, a destination change command, a supporting terrain change command, a radio communication command, such as a radio frequency adjustment command, an environmental update command, such as a predicted weather command or a predicted traffic command, and an environmental monitoring command, such as a surrounding traffic monitoring command, a field monitoring command or a weather hazard monitoring command;
  each generated change command being preferably still used to simulate a flight alternative of the aircraft.

the determination module is configured to determine the group of avionics functional component(s) based additionally on user characteristic(s) and/or company characteristic(s) related to a company chartering the aircraft;

each user characteristic being preferably selected from the group consisting of: a duration of use of the respective functional component on previous flight(s), a number of recommendations of the respective functional component accepted by the user;

the company characteristic preferably depending on passenger satisfaction criteria(s) from previous flight(s);

a weighting coefficient is related to each user characteristic and/or each company characteristic, and the determination module is configured to calculate each overall score depending on the respective weighting coefficients, each respective weighting coefficient being applied to a corresponding elementary score;

the set of predefined flight modalities includes a minimum distance flown modality, an earliest arrival at destination modality, a minimum turbulence modality, a route modality with the best network connectivity, and a minimum fuel consumption modality;

each avionics functional component is selected from the group consisting of: a takeoff condition component, a landing condition component, a taxiing management component, a passenger management component, a crew management component, a flight management component, an aircraft status component, and a takeoff procedure component; and the number of functional components included in the group of avionics functional components is between 2 and 8, preferably between 3 and 5, and preferably 4.

The invention also has as object a method for assisting in the configuration of a flight of an aircraft, the method being implemented by an electronic configuration assist device and comprising the following steps:

the acquisition of a flight modality, previously selected by a user among a set of predefined flight modalities;

determining a group of avionics functional components as a function of the acquired modality, each functional component presenting an elementary score for each predefined flight modality, an overall score being calculated for each possible group of components from the elementary score or scores of the components of the said group for the acquired modality, the determined group being the one having the best overall score among the calculated overall scores; and the display of information relative to each component of the specified group of the avionics functional components.

The invention also relates to a non-transitory computer-readable medium comprising a computer program including software instructions which, when executed by a computer, implement a preparation method, as defined above.

BRIEF DESCRIPTION OF THE DRAWINGS

These features and advantages of the invention will appear more clearly on reading the description that follows, given only as a non-limiting example, and made with reference to the appended drawings, on which.

DETAILED DESCRIPTION

Figure 1:
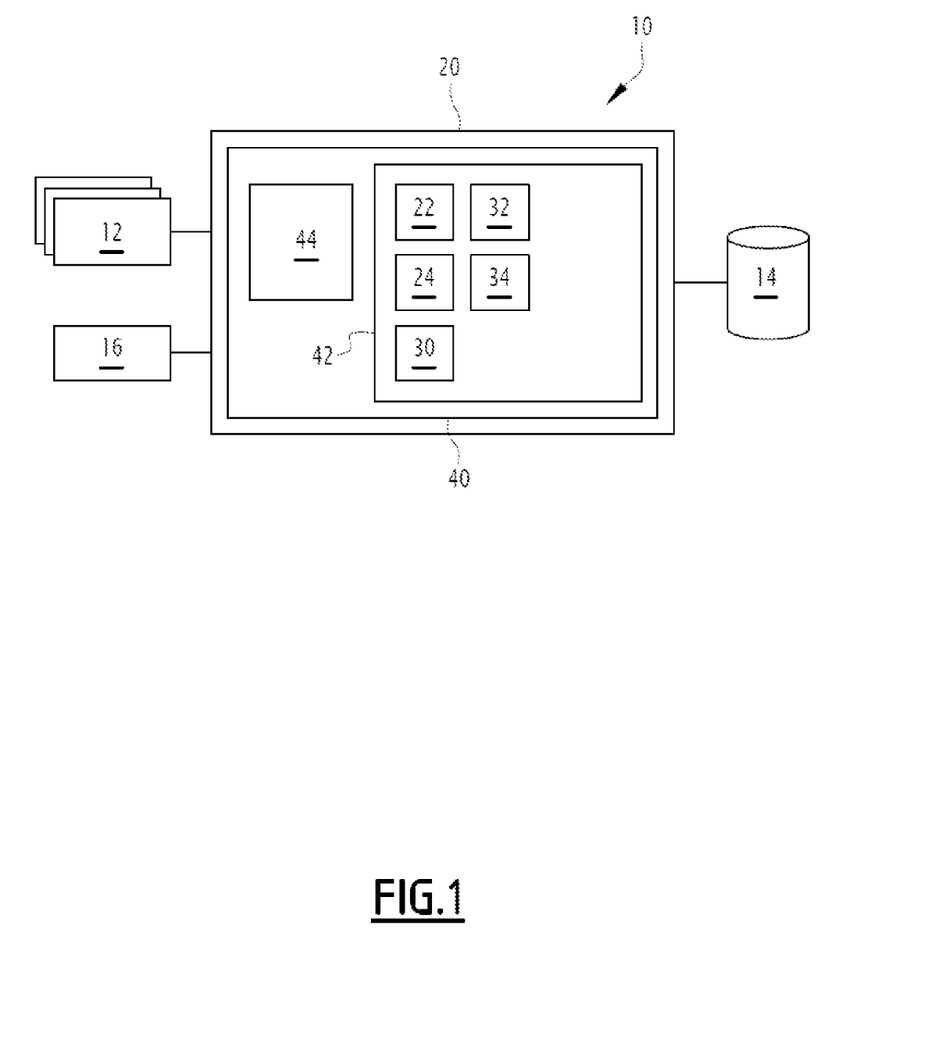
FIG. 1 is a schematic representation of an aircraft comprising an electronic device according to the invention for assisting the configuration of a flight of the aircraft, the configuration assist device being connected to the avionics systems, to a database, and to a display system.

In FIG. 1, an aircraft 10 comprises a plurality of avionics systems 12, a database 14, one or more display systems 16, and an electronic configuration assist device 20 for the aircraft 10, the electronic configuration assist device 20 being connected to the avionics system 12, the database 14 and the display system(s) 16.

Figure 2:
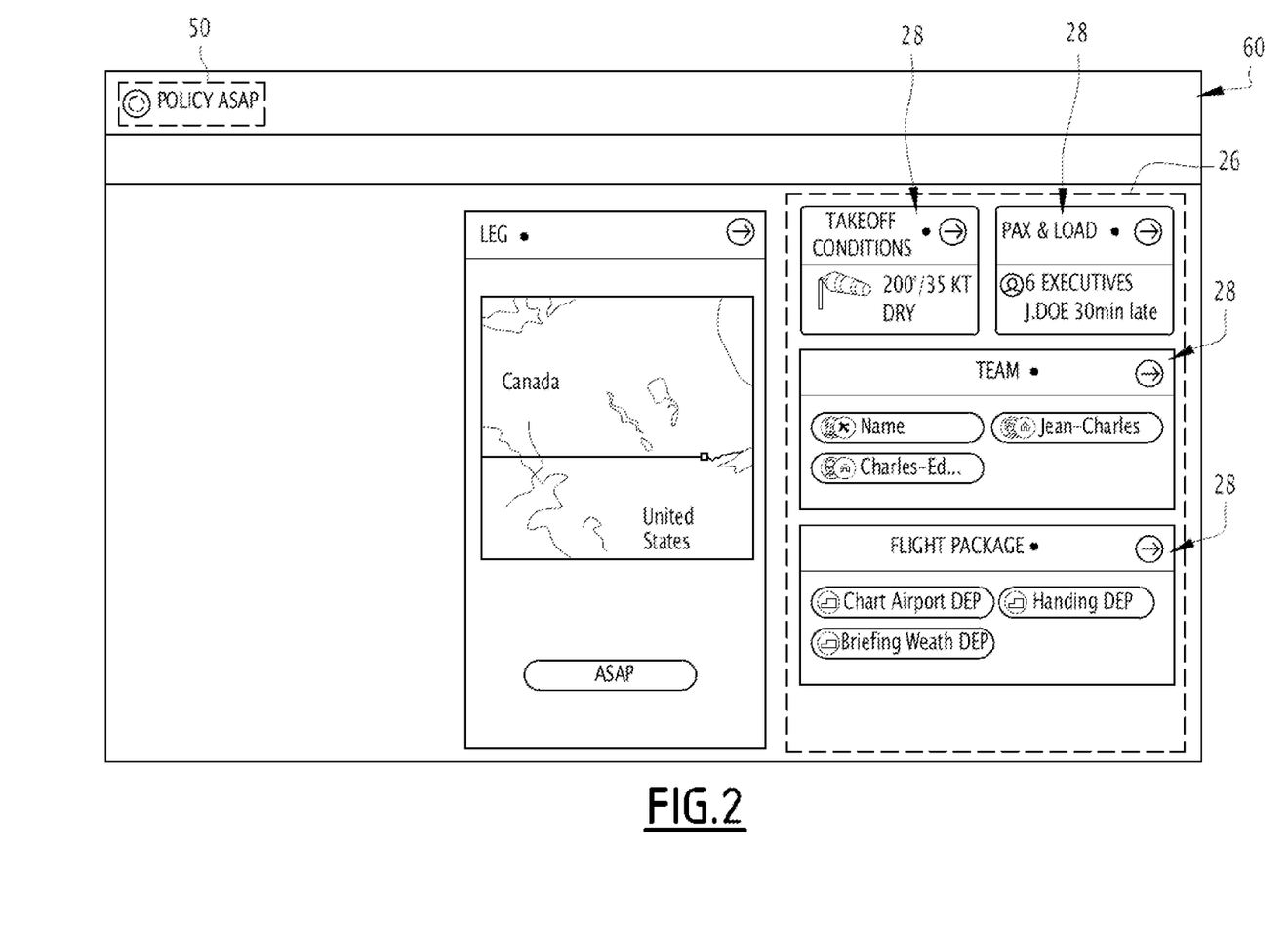
FIG. 2 is a schematic representation of a view displayed by the configuration assist device on the display system of FIG. 1, according to a first example.
Figure 3:
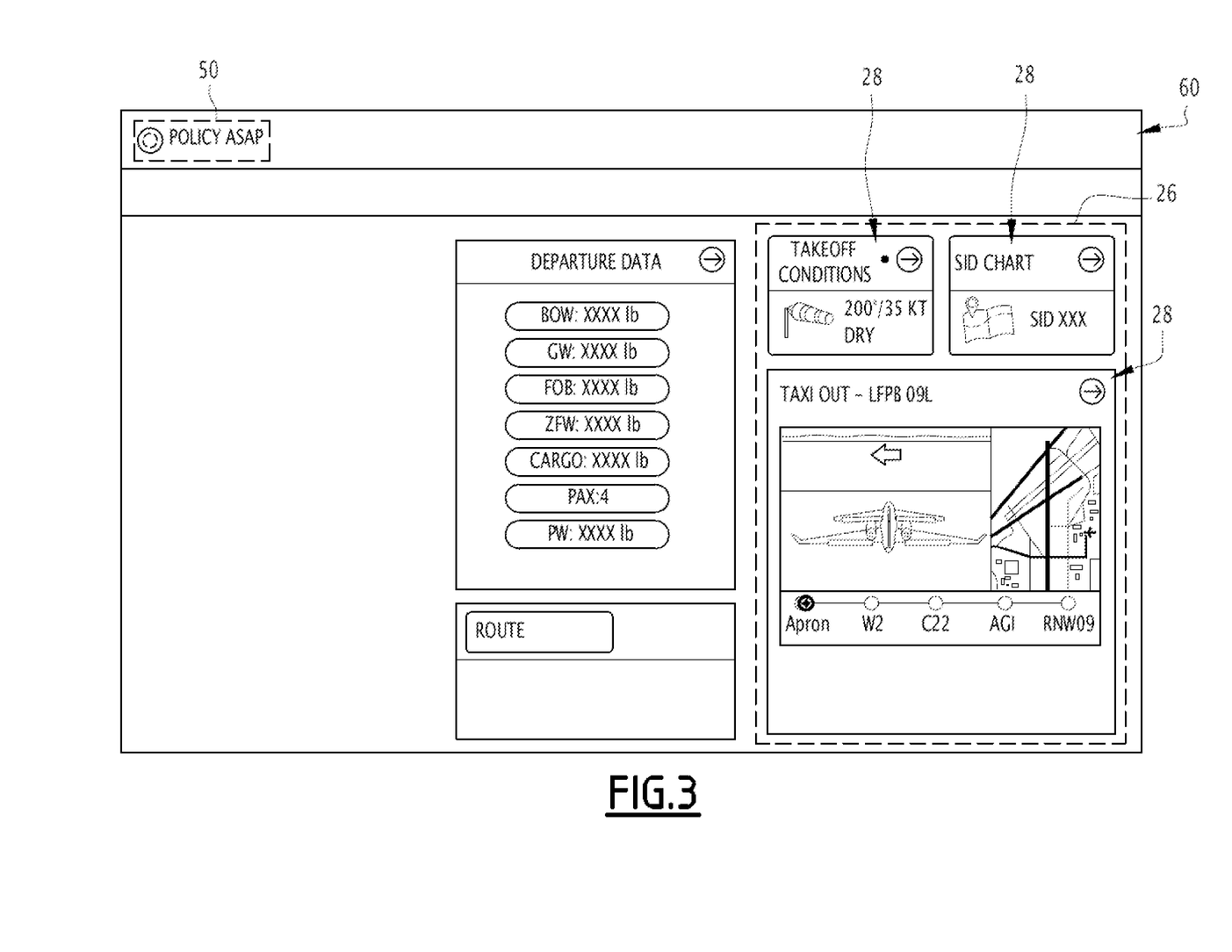
FIG. 3 is a view similar to FIG. 2, according to a second example.
Figure 4:
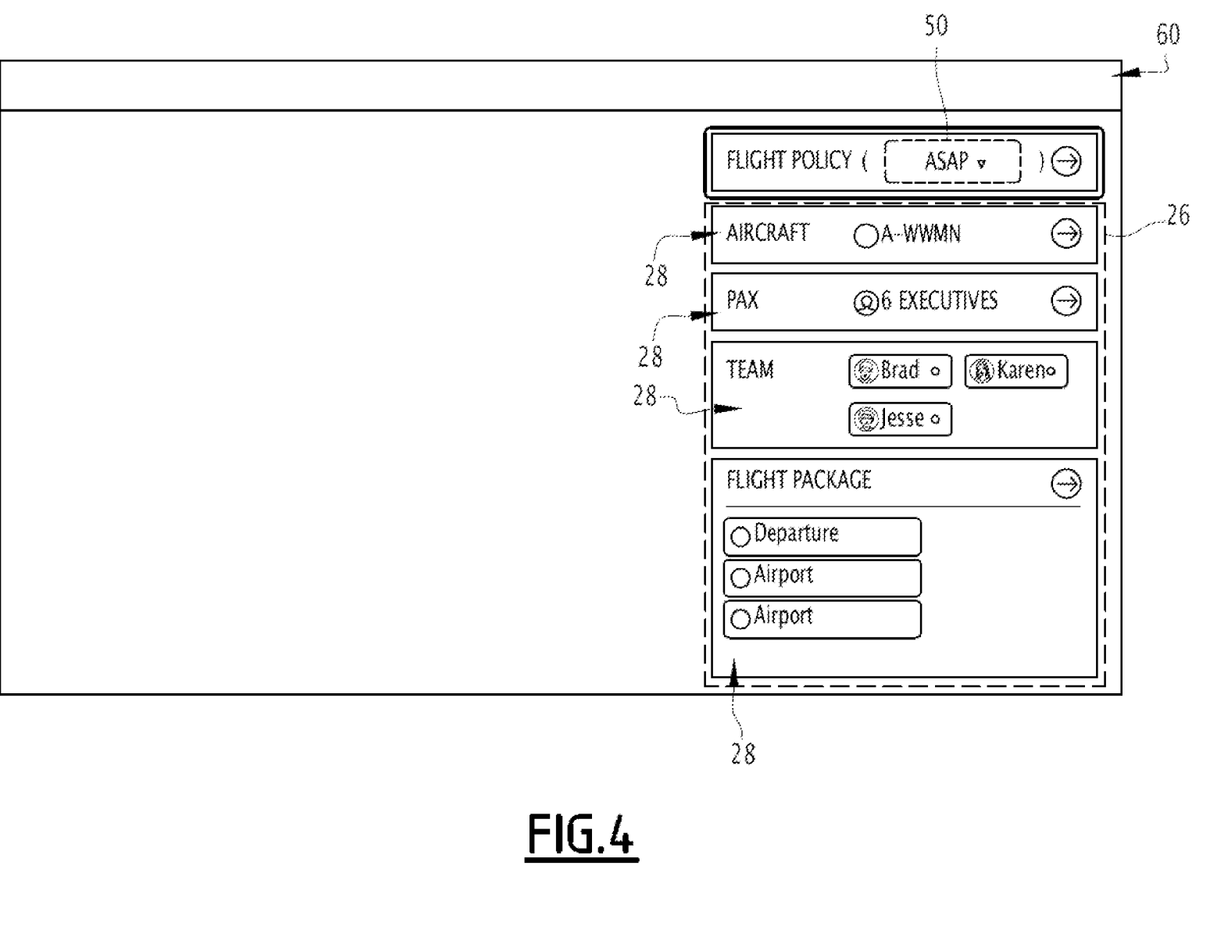
FIG. 4 is a view similar to that of FIG. 2, according to a third example.

The aircraft 10 is, for example, an aircraft as in the examples in FIGS. 2 to 4. Alternatively, the aircraft 10 is a helicopter, a drone remotely piloted by a pilot, or an autonomous aircraft without an operator.

The avionics systems 12 are known per se and are capable of transmitting various avionics data to the electronic configuration assist device 20, for example so-called "aircraft" data, such as the position, speed, acceleration, orientation, heading or even the altitude of the aircraft 10, and/or the so-called "navigation" data, such as a flight plan.

The avionics systems 12 are also capable of receiving instructions, or even commands, from the configuration assist device 20.

For example, each avionics system 12 is selected from the group consisting of:

a flight management system for aircraft 10, also known as FMS (Flight Management System), a flight warning system, also known as FWS (Flight Warning System)

a radio management system, also known as RMS (Radio Management System), a communication management unit, also known as CMU (Communication Management Unit), an air traffic service unit, also known as the ATSU, (Air Traffic Service Unit), a traffic collision alert system, also known as TCAS (Traffic Collision Air System, or Threat-Analysis/Collision Avoidance System, or Traffic Collision Avoidance System), a Terrain Awareness Warning System (TAWS), and an autopilot system, also called PA for automatic pilot, or even AP (Automatic Pilot).

The database 14 is optional, typically a navigation database, and is known per se. The navigation database is also called NAVDB (Navigation Data Base), and includes data relating to the runways on which the aircraft 10 is likely to land, or data relating to prohibited spaces or flight zones.

For example, the database 14 also includes a set of predefined flight modalities, which are used to assist in the configuration of the flight of the aircraft 10, as will be described in more detail later.

The set of predefined flight modalities includes for example:

a minimum distance flown modality, i.e. a modality to achieve the shortest flight in distance;

an earliest arrival at destination modality, i.e. a modality aimed at obtaining the fastest flight, or with the highest probability of saving time;

an optimal turbulence modality, in order to optimize the comfort of the passengers in the aircraft 10, a route modality with the best network connectivity, i.e. allowing to obtain a flight offering, from within the cabin of the aircraft 10, the best connectivity to a communications network, typically with the best quality of network coverage, i.e. corresponding to a minimum number of disconnections from the network, or offering the best communications speed with the said network; and a minimum fuel consumption modality, aimed at obtaining the most fuel-efficient flight.

In the example in FIG. 1, the database 14 is an external database to the configuration assist device 20. Alternatively, not shown, the database 14 is an internal database to the said configuration assist device 20.

The display system(s) 18 are, for example, on-board display screens in the cockpit of the aircraft 10, as in the example in FIG. 1, and/or a screen of a personal electronic device, also noted PED, the workspace related to the configuration assist device 20 being intended to be accessible both on the PED and on the cockpit screen. When the display system 18 is embarked on board the cockpit of the aircraft 10, it is for example a head down display system and/or a head up display system, also called HUD (Head Up Display). An example of a head-down display system is a Navigation Display. Alternatively or in addition, the display system 18 is a remote display system, in particular a display system external to the aircraft 10, such as a display system in a ground station.

The electronic configuration assist device 20 is configured to provide assistance to the user, such as the pilot of the aircraft 10, for the configuration of the flight of the aircraft 10, whether before a flight, for example during mission preparation, during the actual flight, or after the flight, for example during taxiing or after the arrival of the aircraft 10 at its parking point.

In particular, the configuration assist device 20 is configured to offer the user an adaptive workspace that adapts in particular to a flight modality that he has previously selected from the set of predefined flight modalities. The workspace then comprises a group of avionics functional component(s) which is determined according to the said modality previously selected by the user. In particular, the configuration assist device 20 is adapted to offer the user such an adaptive workspace, without the need for the user to intervene to modify this workspace, after having selected the desired flight modality.

The configuration assist device 20 comprises a module 22 for acquiring a flight modality previously selected by the user from the set of predefined flight modalities, and a module 24 for determining a group 26 of avionics functional component(s) 28 according to the acquired modality.

The configuration assist device 20 includes an information display module 30 relating to each component 28 of the determined group 26.

As an optional complement, the configuration assist device 20 also includes a module 32 for generating, via the determined group 26 of avionics functional components 28, at least one change command relating to a flight phase of the aircraft 10.

As another optional addition, the configuration assist device 20 also includes a module 34 for transmitting each generated change command to at least one corresponding avionics system 12.

In the example in FIG. 1, the electronic configuration assist device 20 comprises an information processing unit 40 comprising, for example, a memory 42 and a processor 44 related to the memory 42.

In the example in FIG. 1, the acquisition module 22, the determination module 24 and the display module 30, as well as, as an optional addition, the generation module 32 and the transmission module 34, are each in the form of software, or a software brick, which can be executed by the processor 44. The memory 42 of the electronic configuration assist device 20 is then capable of storing software for acquiring a flight modality previously selected by the user; software for the determined group 26 of avionics functional component(s) 28 according to the modality acquired by the acquisition software; and software for displaying information relating to each component 28 of the determined group 26. In an optional addition, the memory 42 of the electronic configuration assist device 20 is capable of storing software for generating, via the determined group 26, of at least one change command relative to a flight phase of the aircraft 10; and software for transmitting each change command generated by the generation software to at least one corresponding avionics system 12. The processor 44 is then capable of executing each of the acquisition software, the determination software, and the display software, as well as, as an optional addition, the generation software, and the transmission software.

When alternatively, not shown, the database 14 is an internal database of the configuration assist device 20, it is typically capable of being stored in a memory of the configuration assist device 20, such as the memory 42.

As a complement, the electronic configuration assist device 20 comprises a plurality of information processing units 40 each comprising, for example, a respective memory 42 and a respective processor 44 related to the said memory 42. According to this complement, the display module 30 and the transmission module are each housed on a respective data processing unit 40, separate from the data processing unit 40 housing the other modules of the electronic configuration assist device 20, namely the acquisition module 22, the determination module 24 and the generation module 32.

Alternatively, not shown, the acquisition module 22, the determination module 24, the display module 30, and optionally the generation module 32 and the transmission module 34 are each implemented as a programmable logic component, such as a Field Programmable Gate Array (FPGA), or as a dedicated integrated circuit, such as an Application Specific Integrated Circuit (ASIC).

When the configuration assist device 20 is in the form of one or more software programs, i.e. as a computer program, it is also suitable for storage on a computer-readable medium, not shown. A computer-readable medium is, for example, a medium capable of storing electronic instructions and of being coupled to a bus of a computer system. For example, the readable medium is an optical disk, magneto-optical disk, ROM, RAM memory, any type of non-volatile memory for example. EPROM, EEPROM, FLASH, NVRAM), magnetic card or optical card. On the readable medium is then stored a computer program containing software instructions.

The acquisition module 22 is configured to acquire the flight modality previously selected by the user from among the set of predefined flight modalities. As described previously, this set of predefined flight modalities includes for example a minimum distance flown modality, i.e. for the shortest flight; an earliest arrival at destination modality, i.e. for the fastest flight, also called ASAP (As Soon As Possible), as in the example in FIGS. 2 to 4; a minimum turbulence modality, for the flight with the least turbulence; a route modality with the best network connectivity; and a minimum fuel consumption modality, for the most fuel-efficient flight.

The selection of the said flight modality by the user is for example made via a modality selection button 50. The modality selection button 50 is, for example, a touch button as in the example in FIGS. 2 to 4 where the human-machine interface is a touch interface, or a mechanical button, such as a selector wheel.

The determination module 24 is configured to determine the group 26 of avionics functional component(s) 28 according to the modality acquired by the acquisition module 24, each functional component 28 presenting an elementary note for each predefined flight modality, an overall note being calculated for each possible group 26 of component(s) 28 based on the elementary note(s) of the components 28 of the said group 26 for their acquired modality, the determined group 26 being then the one having the best overall note among the different overall notes calculated.

The determination module 24 is, for example, configured to calculate, for each functional component 28, the elementary note of the said functional component 28 for the acquired modality, and to then determine the group 26 as being the one comprising the N avionics functional components 28 presenting the N best elementary notes for the said acquired modality, where N is the number of avionics functional components 28 included in the group 26. The number N is for example a parameter chosen by the user. The number N of avionics functional components 28 included in the group 26 is for example between 2 and 8, preferably between 3 and 5, and preferably still equal to 4.

The determination module 24 is then for example, configured to calculate each elementary note of the avionics functional component(s) 28 for the acquired modality according to the following equation:

$$P_{M_j} = \sum_{i=1}^{n} |\alpha_i - \alpha_{M_{ji}}| \qquad [1]$$

where $P_{M_j}$ represents the elementary note of the avionics functional component 28, denoted Mj, for the flight modality P, also called flight policy;

j is an integer index between 1 and N designating the avionics functional component 28 within the group 26;

$\alpha_i$ represents a performance criterion for the flight modality P, each criterion preferably having a value between 0 and 1;

i is an integer index between 1 and n designating the performance criterion among the n performance criterion(s) for flight modality P; and $\alpha_{M_{ji}}$ represents the ability of the avionics functional component 28, denoted Mj, to meet the performance criterion $\alpha_i$ for the flight modality P, with each capability preferably having a value between 0 and 1.

Preferably, the performance criteria for the flight modality P further verify the following equation:

$$\sum_{i=1}^{n} \alpha_i = 1 \qquad [2]$$

Preferably still, the capabilities of the avionics functional component 28 also verify the following equation:

$$\sum_{i=1}^{n} \alpha_{M_{ji}} = 1 \qquad [3]$$

As an optional complement, the determination module 24 is configured to determine the avionics functional component of the group 26 as a function of additional user and/or company feature(s) relative to a company chartering the aircraft 10.

According to this optional complement, each user characteristic is, for example, selected from the group consisting of: a duration of use of the respective functional component 28 on previous flight(s), a number of recommendations of the respective functional component 28 accepted by a user.

According to this optional complement, the company characteristic depends for example on passenger satisfaction criterion(s) from previous flight(s).

According to this optional complement, a weighting coefficient is for example related to each user characteristic and/or each company characteristic, and the determination module 24 is then configured to calculate each overall score based on the respective weighting coefficient(s), each respective weighting coefficient being applied to a corresponding elementary score.

For example, each avionics functional component 28 is selected from the group consisting of: a takeoff condition component(s), a landing condition component(s), a taxi management component, a passenger management component, a crew management component, a flight management component, an aircraft status component, and a takeoff procedure component.

Each functional component 28 is then, for example, in the form of an elementary human-machine interface module, such as an elementary touch interface module.

In FIGS. 2 to 4, different views of a human-machine interface 60 of the configuration assist device 20 according to the invention are shown and illustrate real views including indications in English, as is the case in the aeronautical field. A French translation of the relevant indications is provided where appropriate in the description below.

In the example in FIG. 2, the human-machine interface 60 represents a group 26 of four avionics functional components 28, i.e. four elementary human-machine interface modules. In this example, the predefined flight modality is the earliest arrival modality, also referred to as ASAP (As Soon As Possible), as mentioned via the modality selection button 50. A first avionics functional component illustrated in this example is the TAKE-OFF CONDITIONS component, this avionics functional component 28 allowing the most up-to-date parameters to be obtained to determine the conditions that will be encountered during takeoff, such as meteorological and atmospheric conditions and the condition of the runway for takeoff. A second avionics functional component 28 illustrated in this example is the passenger management component (PAX & LOAD). This component provides a list of passengers and a description of their baggage. For example, each passenger (PAX) is briefly described by his or her first and last name(s), along with information about his or her expectations for the flight and any regulatory documents that may be required by customs. A third avionics functional component 28 illustrated in FIG. 2 is the crew management component (TEAM), which can be used, for example, to provide a list of crew members and employees who will contribute to the mission. This avionics functional component 28 is notably capable of providing information, such as flight time limitations, or regulatory documents for customs. In addition, this avionics functional component 28 for crew management also includes electronic messaging functionality between crew members. The fourth and last avionics functional component 28 illustrated in FIG. 2 is the FLIGHT PACKAGE component, which is particularly capable of providing a set of documents and media required to complete the flight, such as a description of the flight plan, meteorological messages, such as TAF messages (Terminal Aerodrome Forecast), METAR messages (MEteorological Aerodrome Report), NOTAM messages (NOTice to AirMen).

In the example in FIG. 3, the predefined flight modality is the earliest ASAP arrival modality, as shown via the modality selection button 50. The determined group 26 consists, in this example, of three avionics functional components 28. A first functional component 28 shown is the TAKE-OFF CONDITIONS component described above, a second avionics functional component 28 also shown is the SID CHART component, which is capable of providing a presentation of the procedure to be followed during takeoff, also known as SID (Standard Instrument Departure), for example in the form of an aeronautical map capable of being projected onto a 2D or 3D graphic representation of the geographical area. In this example in FIG. 3, a third functional component 28 shown is the TAXI OUT component, which is able to show a 2D or 3D representation of the airport to locate the aircraft 10 on the airport, as well as the path to follow. As an optional complement, this avionics functional component 28 can also alert the user to the proximity of the aircraft 10 to an obstacle, to another aircraft, or even to the non-respect of the path to follow on the airport.

In the example in FIG. 4, the predefined flight modality is the earliest arrival ASAP modality, as mentioned via the modality selection button 50. The determined group 26 comprises, in this example, four avionics functional components 28, namely the passenger management component, also known as PAX, the crew management component, also known as TEAM, the flight management component, also known as FLIGHT PACKAGE, these three functional components 28 having been described previously, as well as the aircraft status component, also known as AIRCRAFT. The aircraft status component is, for example, able to provide the status of the aircraft 10, a list of planned maintenance activities, as well as advice on how to carry out a flight in accordance with the selected flight modality.

The generation module 32 is configured to generate, via the determined group 26 of avionics functional component(s) 28, at least one change command relating to a flight phase of the aircraft 10.

Each generated change command is typically a change command for the parameter(s) of an avionics function.

An avionics function is defined as a function that assists in the piloting of the aircraft 10, particularly in airspace, such as a flight management function, a navigation radio management function, a terrain collision avoidance function, a meteorology function, on-board information function, or a mission planning function.

Each avionics function is then typically capable of being implemented by a corresponding avionics system 12, such as one of the avionics systems 12 described above.

The person skilled in the art will then understand that the flight management function can be implemented by the flight management system or FMS, the navigation radio management function can be implemented by the radio management system or RMS, and the terrain anti-collision function can be implemented by the terrain warning system or TAWS, the meteorology function can be implemented by a weather radar system, the on-board information function can be implemented by an AIS (Avionics Interface Systems) receiver, and the mission preparation function can be implemented by a mission preparation system.

Each generated change command is then selected from the group consisting of, for example: a speed change command, an altitude change command, a route change command, a destination change command, a supporting terrain change command, a radio communication command, such as a radio frequency adjustment command, an environmental update command, such as a predicted weather command or a predicted traffic command, and an environmental monitoring command, such as a surrounding traffic monitoring command, a terrain monitoring command or a weather hazard monitoring command.

Each generated change command is preferably used to simulate a flight alternative of the aircraft 10.

For example, each avionics functional component 28 is capable of promoting one or more change commands, i.e., one or more commands, in a language that can be interpreted by one or more avionics systems 12.

The generation module 32 is then configured, for example, to aggregate a plurality of change commands issued by several avionics functional components 28 in order to avoid sending a series of contradictory change commands to the avionics systems 12.

As a complement, the generation module 32 is also configured to generate a respective change command only if it has been previously validated by the user.

The transmission module 34 is configured to then transmit each change command generated by the generation module 32 to at least one corresponding avionics system 12, so that the generated change command is taken into account by the said avionics system(s) 12.

Figure 5:
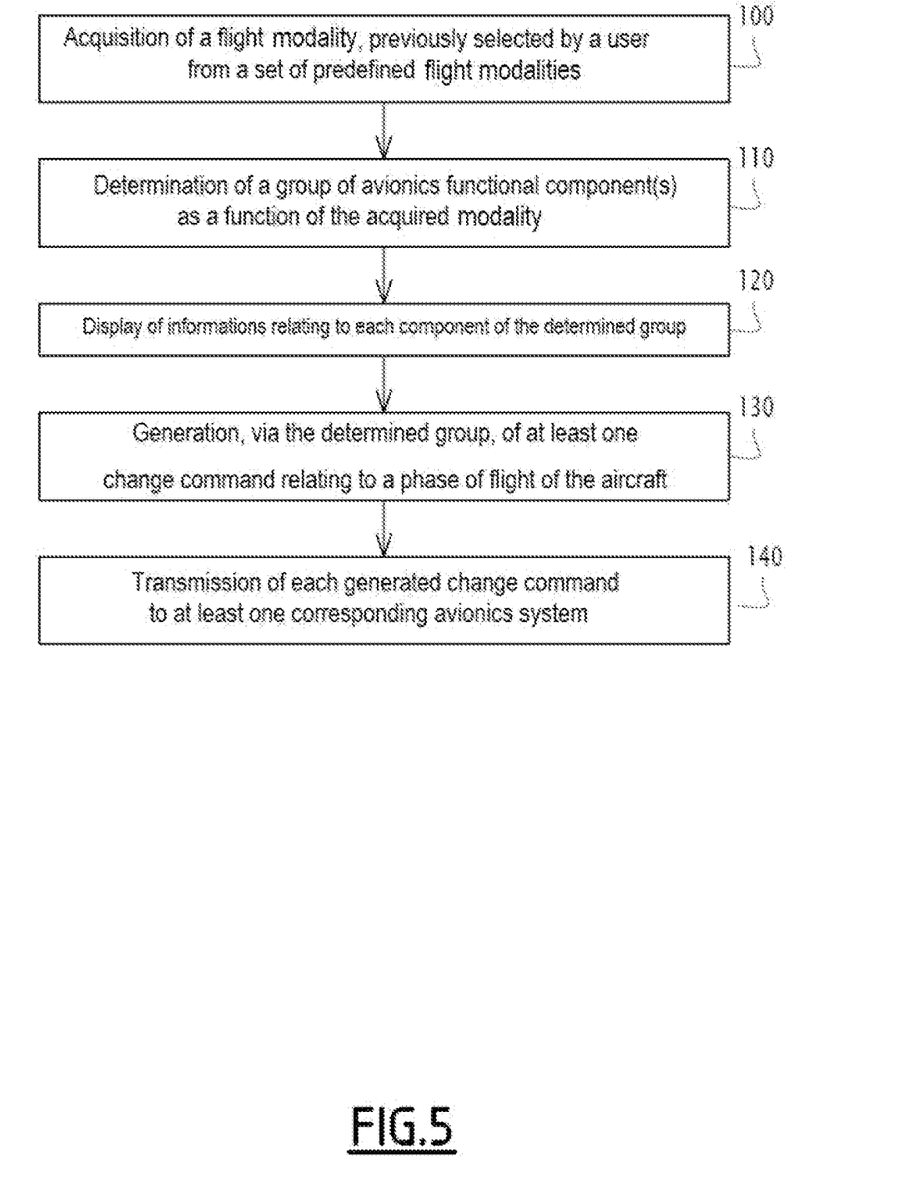
FIG. 5 is a flowchart of a method, according to the invention, for assisting in the configuration of a flight of the aircraft, the method being implemented by the electronic configuration assist device of FIG. 1.

The operation of the electronic configuration assist device 20 according to the invention will now be described relative to FIG. 5 showing a flowchart of the method, according to the invention, of assisting the configuration of a flight of the aircraft 10, the method being implemented by the electronic configuration assist device 20.

During an initial step 100, the configuration assist device 20 acquires, via its acquisition module 22, the flight modality previously selected by the user from among the set of predefined flight modalities. This prior selection of the modality is typically carried out via the modality selection button 50.

In the example of FIGS. 2 to 4, the flight modality acquired during step 100 is the earliest arrival modality at the destination, noted ASAP.

The configuration assist device 20 then determines, during the next step 110, and via its determination module 24, a group 26 of avionics functional component(s) 28 according to the modality acquired during step 100, each functional component 28 presenting an elementary note for each predefined flight modality, and an overall note being calculated for each possible group 26 of components 28 from the elementary note(s) of component(s) 28 of the said group 26 for the modality acquired during step 100. The group 26 determined during step 110 by the determination module 24 is then the one having the best overall score among the overall scores calculated for the different possible groups 26.

As an example, the number N of avionics functional components 28 for the group 26 is predefined, and the determination module 24 then determines group 26 as being the one including the N avionics functional components 28 presenting the N best elementary scores for the modality acquired during step 100.

During the following step 120, the configuration assist device 20 then displays, via its display module 30, the information relative to each avionics functional component 28 of the group 26 determined during step 110. For example, each avionics functional component 28 is in the form of a human-machine interface (HMI) elementary module, and the information relative to each avionics functional component 28 is then displayed within each respective HMI elementary module.

As an optional complement, the configuration assist device 20 also generates, in a subsequent step 130 and via its generation module 32, at least one change command relating to a flight phase of the aircraft 10, and this via the determined group 26 of avionics functional component(s) 28.

If applicable, i.e. if at least one change command is generated during the preceding step 130, the configuration assist device 20 then transmits, via its transmission module 34 and during the following step 140, each change command generated during step 130 to at least one corresponding avionics system 12.

At the end of step 140, the configuration assist device 20 returns to the initial step 100, in order to acquire a new flight modality selected by the user if necessary and then updates the HMI of the configuration assist device 20 accordingly.

As an optional complement, the configuration assist device 20 is able to propose a change of flight modality to the user, following the detection of a change in the operational conditions of the aircraft 10. Indeed, the configuration assist device 20 forms an aeronautical information aggregator, and is then able to detect changes in operational conditions, such as changes in weather conditions, changes relative to the opening and/or closing of infrastructures, drops in satellite internet bandwidth in a given geographical area, etc. In addition to this role as an aggregator, the configuration assist device 20 is also configured to evaluate the impact of these detected changes on the flight modality selected by the user, and to then recommend a possible change of flight modality to the user. This additional flight modality change suggestion functionality is described in more detail in the patent application entitled "Aircraft Management" with application number FR 18 00639.

Thus, the configuration assist device 20 according to the invention makes it possible to propose to the user, such as the pilot of the aircraft 10, an adaptive workspace, the latter adapting in particular to the flight modality previously selected by him. The group 26 of avionics functional component(s) 28 displayed is in fact determined as a function of the said flight modality previously selected by the user and acquired by the acquisition module 22.

The person skilled in the art will also understand that a change of flight modality on the part of the user is then likely to lead automatically to a modification of the workspace, without any action on the part of the user other than the simple selection of this new flight modality. The group 26 of avionics functional component(s) 28 corresponding to the new flight modality selected is then automatically determined by the determination module 24, following the new flight modality acquired by the acquisition module 22.

Preferably, the group 26 of avionics functional component(s) 28 displayed is determined according to the user and/or the company characteristic(s), and the adaptive workspace is then also a workspace that adapts to the habits of the user and/or the company characteristics, for example to a previous flight history(s) of the aircraft 10.

The person skilled in the art will further observe that the adaptive workspace is capable of being displayed on any display screen, and wherever the user is located, whether the user is inside the aircraft 10, typically facing a display screen on board the cockpit of the aircraft 10, or outside the aircraft 10, for example in front of the screen of his personal electronic device, also known as PED, when preparing the mission of the aircraft 10.

The workspace corresponding to the information displayed on the screen by the configuration assist device 20 is then accessible both on the PED and on the screen of the cockpit of the aircraft 10, and the skilled person will also understand that this workspace is capable of adapting to the dimensions of the screen on which it is displayed.

The configuration assist device 20 also makes it possible to offer the user such an adaptive workspace without any intervention on their part to modify this workspace, other than the prior selection of the desired flight modality.

It is therefore conceivable that the electronic device, and the related method, of flight configuration assistance according to the invention, make it possible to facilitate the work of the user, such as the pilot of the aircraft 10, whether before the flight, during the flight, or even after the flight. The configuration assist device 20 according to the invention thus makes it possible to reduce the cognitive load for the user, and thus to improve the flight safety of the aircraft 10.

The invention claimed is:

1. An electronic device for assisting in a configuration of a flight of an aircraft, the electronic device comprising:
    an acquisition module configured to acquire a flight modality, previously selected by a user from a set of predefined flight modalities, the set of predefined flight modalities including, a minimum distance flown modality, an earliest arrival at destination modality, a minimum turbulence modality, a route modality with a best network connectivity, and a minimum fuel consumption modality;
    a determination module configured to determine a group of avionics functional component(s) as a function of the acquired modality, each functional component presenting an elementary score for each predefined flight modality, an overall score being calculated for each possible group of components from the elementary score or scores of the components of the said group for the acquired modality, the determined group being the one having a best overall score among the calculated overall scores,
    each avionics functional component being selected from the group consisting of: a takeoff condition component, a landing condition component, a taxi management component, a passenger management component, a crew management component, a flight management component, an aircraft status component, and a takeoff procedure component;
    a display module configured to display information relative to each component of the determined group of avionics functional component(s), a generation module configured to generate, via the determined group of avionics functional component(s), at least one change command relating to a flight phase of the aircraft, and a transmission module configured to transmit each generated change command to at least one corresponding avionics system, so that the generated change command is taken into account by the avionics system.

2. The device according to claim 1, wherein each avionics system is selected from the group consisting of: a flight management system, a flight warning system, a radio management system, a communications management unit, an air traffic services unit, a traffic collision alert system, a terrain awareness and warning system, and an autopilot system.

3. The device according to claim 1, wherein each generated change command is a change command for a parameter (s) of an avionics function.

4. The device according to claim 1, wherein each generated change command is selected from the group consisting of: a speed change command, an altitude change command, a route change command, a destination change command, a supporting terrain change command, a radio communication command, an environmental update command, and an environmental monitoring command.

5. The device according to claim 4, wherein the radio communication command is a radio frequency adjustment command.

6. The device according to claim 4, wherein the environmental update command is a predicted weather command or a predicted traffic command.

7. The device according to claim 4, wherein the environmental monitoring command is a surrounding traffic monitoring command, a terrain monitoring command or a weather hazard monitoring command.

8. The device according to claim 1, wherein each generated change command is used to simulate a flight alternative of the aircraft.

9. The device according to claim 1, wherein the determination module is configured to determine the group of avionics functional component(s) further as a function of user characteristic(s) and/or company characteristic(s) relating to a company chartering the aircraft.

10. The device according to claim 9, wherein each user characteristic is selected from the group consisting of: a duration of use of the respective functional component on previous flight(s), a number of recommendations of the respective functional component accepted by the user.

11. The device according to claim 9, wherein the company characteristic is dependent on passenger satisfaction criterion(s) from previous flight(s).

12. The device according to claim 9, wherein a weighting coefficient is related to each user characteristic and/or each company characteristic, and the determination module is configured to calculate each overall score further depending on the respective weighting coefficient or coefficients, each respective weighting coefficient being applied to a corresponding elementary score.

13. The device according to claim 1, wherein a number of the functional components included in the group of the avionics functional components is between 2 and 8.

14. The device according to claim 13, wherein the number of the functional components included in the group of the avionics functional components is between 3 and 5.

15. A method for assisting a configuration of a flight of an aircraft, the method being implemented by an electronic configuration assistance device, and comprising:

acquisition of a flight modality, previously selected by a user from a set of predefined flight modalities, the set of predefined flight modalities including a minimum distance flown modality, a modality for arriving at destination as soon as possible, a minimum turbulence modality, a route modality with a best network connectivity, and a modality for a minimum quantity of fuel consumed;

determination of a group of avionics functional component(s) according to the acquired flight modality, each functional component presenting an elementary score for each predefined flight modality, an overall score being calculated for each possible group of components from the elementary score or scores of the components of the said group for the acquired modality, the determined group being the one having a best overall score among the calculated overall scores, each avionics functional component being selected from the group consisting of: a takeoff condition component, a landing condition component, a taxi management component, a passenger management component, a crew management component, a flight management component, an aircraft status component, and a takeoff procedure component; and display of information relating to each component of the determined group of avionics functional component(s), generation, via the determined group of avionics functional component(s), at least one change command relating to a flight phase of the aircraft, and transmission of each generated change command to at least one corresponding avionics system, so that the generated change command is taken into account by the avionics system.

16. A non-transitory computer-readable medium comprising a computer program comprising software instructions which, when executed by a computer, implement a method comprising:

acquisition of a flight modality, previously selected by a user from a set of predefined flight modalities, the set of predefined flight modalities including a minimum distance flown modality, a modality for arriving at destination as soon as possible, a minimum turbulence modality, a route modality with a best network connectivity, and a modality for a minimum quantity of fuel consumed;

determination of a group of avionics functional component(s) according to the acquired flight modality, each functional component presenting an elementary score for each predefined flight modality, an overall score being calculated for each possible group of components from the elementary score or scores of the components of the said group for the acquired modality, the determined group being the one having a best overall score among the calculated overall scores, each avionics functional component being selected from the group consisting of: a takeoff condition component, a landing condition component, a taxi management component, a passenger management component, a crew management component, a flight management component, an aircraft status component, and a takeoff procedure component; and display of information relating to each component of the determined group of avionics functional component(s), generation, via the determined group of avionics functional component(s), at least one change command relating to a flight phase of the aircraft, and transmission of each generated change command to at least one corresponding avionics system, so that the generated change command is taken into account by the avionics system.

* * * * *